United States Patent [19]

Imai

[11] 4,389,099
[45] Jun. 21, 1983

[54] PHOTOGRAPHIC LENS SYSTEM

[75] Inventor: Toshihiro Imai, Hachiouji, Japan

[73] Assignee: Olympus Optical Co., Ltd., Tokyo, Japan

[21] Appl. No.: 283,459

[22] Filed: Jul. 15, 1981

[30] Foreign Application Priority Data

Jul. 17, 1980 [JP] Japan .................................. 55-97781

[51] Int. Cl.³ .............................................. G02B 9/62
[52] U.S. Cl. ................................................. 350/464
[58] Field of Search ..................................... 350/464

[56] References Cited

U.S. PATENT DOCUMENTS 4,221,467 9/1980 Imai ..................................... 350/464
4,235,521 11/1980 Imai .

FOREIGN PATENT DOCUMENTS 38-26133 12/1963 Japan ..................................... 350/464
47-19387 6/1972 Japan .
54-76147 6/1979 Japan .

Primary Examiner—John K. Corbin
Assistant Examiner—Rebecca D. Gass
Attorney, Agent, or Firm—Cushman, Darby & Cushman

[57] ABSTRACT

A photographic lens system for use in a compact camera, having an angular field of view of 60° to 70° and aperture ratio of F/2.8 and comprising a front lens group consisting of a first lens component of a positive meniscus lens with its convex surface on the object side, a second lens component of a biconcave lens and a third lens component of a biconvex lens, and a rear lens group consisting of a fourth lens component of a negative meniscus lens with its convex surface on the object side, a fifth lens component of a positive meniscus lens with its convex surface on the image side and a sixth lens component of a positive meniscus lens with its convex surface on the image side.

5 Claims, 5 Drawing Figures

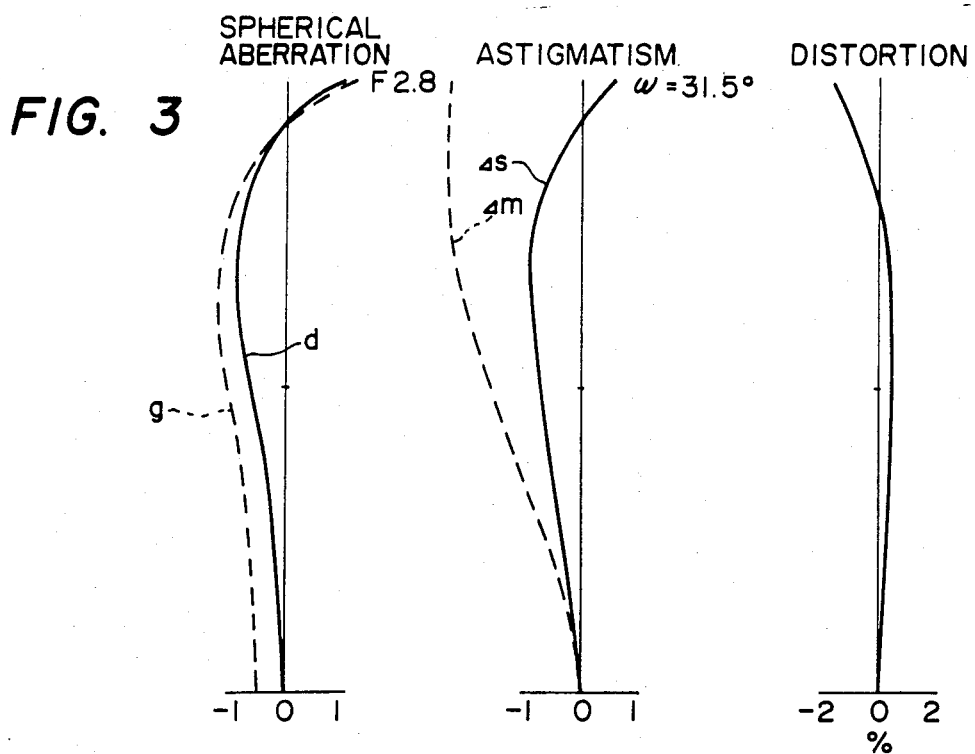
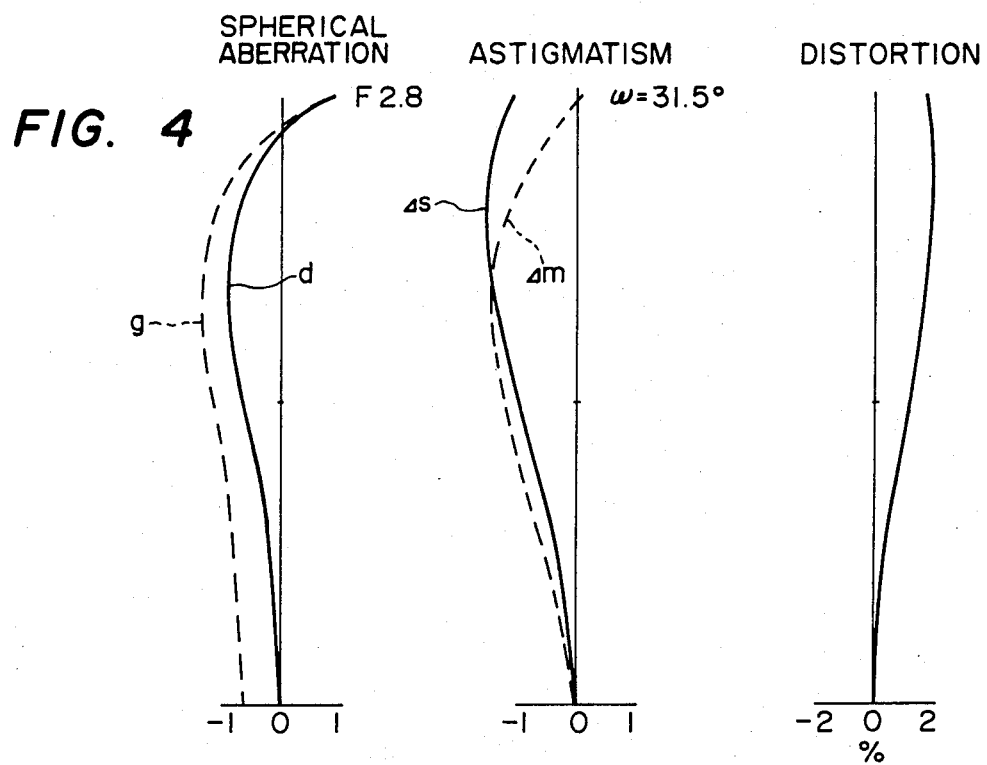

PHOTOGRAPHIC LENS SYSTEM

BACKGROUND OF THE INVENTION (a) Field of the Invention

The present invention relates to a photographic lens system for use in a compact camera having a range finder and using a 35 mm film, and more particularly to a lens system having an angular field of view of 60° to 70° and an aperture ratio of F/2.8, the length from the first lens surface to the film surface being almost as short as the overall focal length.

(b) Description of the Prior Art

Conventionally, for the purpose of making compact a lens system such as described above, a Tessar type lens system with a rear aperture stop has been adopted. However, in a lens system of the Tessar type with a rear aperture stop (as described, for example, in Japanese Published Examined Patent Application No. 19387/72), the length from the first lens surface to the film surface had to be limited to a length in the order of 42 mm for use in a 35 mm film.

In order to eliminate this disadvantage, the inventor of the present application has designed a very compact lens system and has filed it as a Japanese patent application (See Japanese Published Unexamined Patent Application No. 76147/79). In this lens system, the length from the first lens surface to the film surface is made so short as to be about the same as the focal length. However, in this lens system, there has been a space to be more or less improved in respect that the sharpness of the image near the margin of the image plane is somewhat lower than in the central part of the image plane.

The present invention is to provide a very compact photographic lens system wherein the length from the first lens surface to the film surface is not more than 35 mm and various aberrations are well corrected not only in the central part but also in the marginal part of the image plane.

In order to shorten the total length of the lens system, there have been known two methods, one is to shorten the focal length of the lens system and the other is to make the telephoto ratio small (a proportion of the length from the first lens surface to the film surface, to the focal length). In order to make the total length of the lens system markedly short as described above, it is necessary both to shorten the focal length and to make the telephoto ratio small. In order to make the telephoto ratio small, there may be adopted a telephoto type lens system in which a negative lens is arranged in the rear portion of the lens system. However, in order to shorten the focal length in such a telephoto type lens system, it is necessary to secure good lens characteristics over an angular field of view wider than 60° which was inconceivable in a conventional telephoto type lens system.

SUMMARY OF THE INVENTION

According to the present invention, on one hand, a telephoto type lens system is adopted in order to make the telephoto ratio small and, on the other hand, the focal length in the lens system is made as short as possible but the image quality is kept good over a wide angular field of view so that, when they are well balanced, a very compact photographic lens system having superior characteristics can be provided.

The photographic lens system according to the present invention comprises a front lens group consisting of a first lens component of a positive meniscus lens with its convex surface on the object side, a second lens component of a biconcave lens and third lens component of a biconvex lens, and a rear lens group consisting of a fourth lens component of a negative meniscus lens with its convex surface on the object side, a fifth lens component of a positive meniscus lens with its convex surface on the image side and a sixth lens component of a positive meniscus lens with its convex surface on the image side, said lens system satisfying the following conditions:

$$1.2 < f/f_{123} < 1.8 \quad (1)$$

$$-1.3 < f/f_{456} < -0.3 \quad (2)$$

$$0.16 < d_6/f < 0.175 \quad (3)$$

wherein the reference symbol f represents the focal length of the entire lens system, the symbol $f_{123}$ represents the focal length of the front lens group, the symbol $f_{456}$ represents the focal length of the rear lens group, and the symbol $d_6$ represents the axial air space between the front and rear lens groups, respectively.

Generally in the telephoto type lens system comprising positive and negative lenses, it is possible to make the length from the first lens surface to the film surface short by making the telephoto ratio small, but it is difficult to make a lens system as of a wider angular field of view and to make the aperture ratio large, because the larger the angular field of view, the larger the curvature of field.

According to the present invention, there can be obtained a photographic lens system wherein the front lens group is formed as of a triplet type, the rear lens group is formed as of a telephoto type using three negative, positive and positive meniscus lenses and thereby, in spite of the wide angle, the aberrations are favourable even in the marginal part of the angular field of view and the aperture ratio is large.

Further objects and advantages will be apparent in the arrangements as set forth in the following description taken together will the accompanying drawings.

DESCRIPTION OF THE DRAWINGS

FIGS. 3 through 5 are graphs illustrating conditions of aberrations of the first, second and third embodiments, respectively.

DESCRIPTION OF THE PREFERRED EMBODIMENTS

Figure 1:
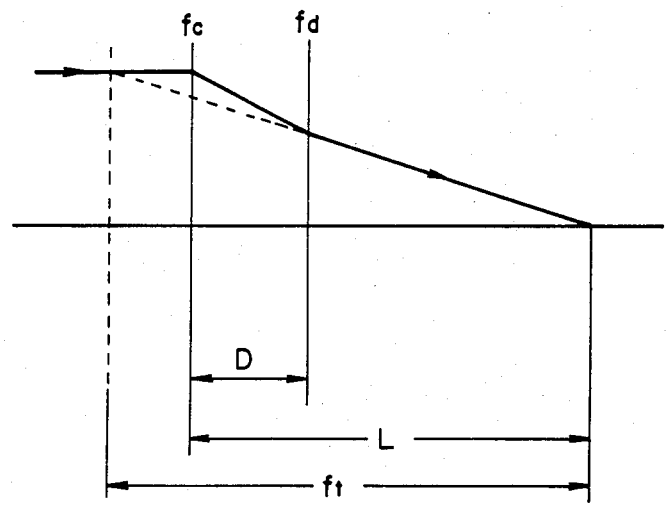
FIG. 1 is a view for explaining the principle of the present invention.
Figure 2:
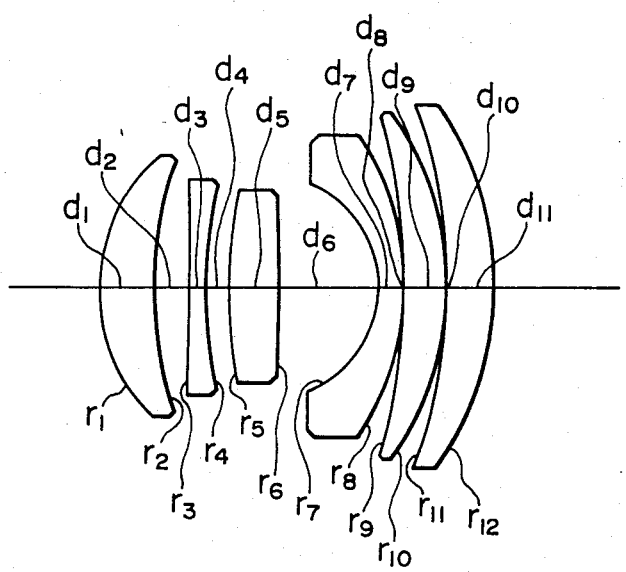
FIG. 2 is a sectional view of the photographic lens system according to the present invention.
Figure 5:
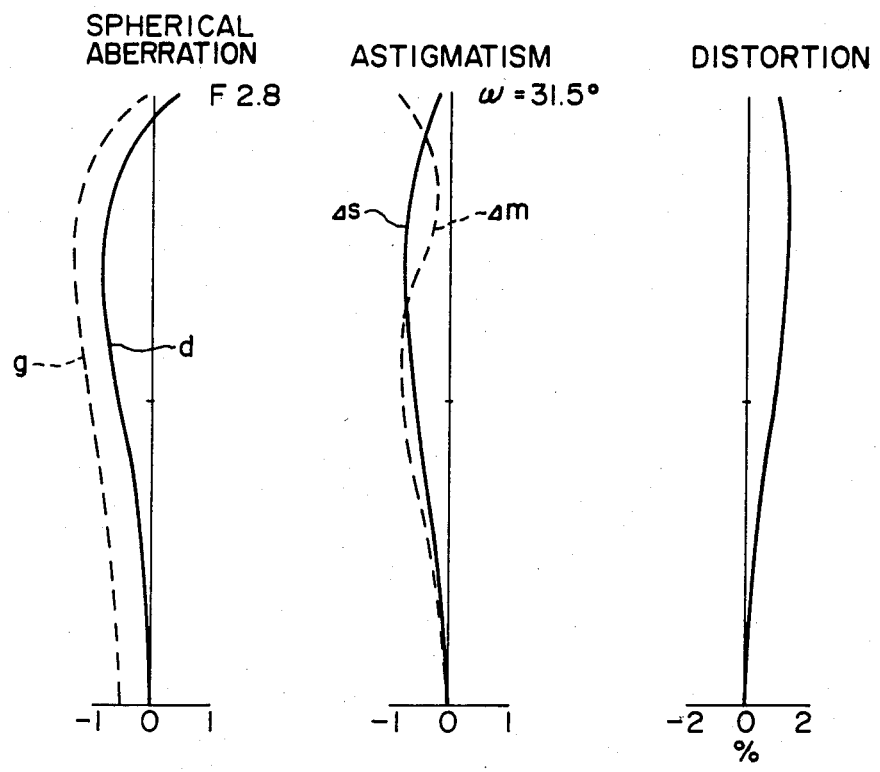

In the photographic lens system according to the present invention, a telephoto type lens system is adopted with a front lens group being of a convergent lens type and a rear lens group being of a dispersive type. As shown in FIG. 1, when a composite focal length of the front lens group is represented by $f_c$, a composite focal length of the rear lens group by $f_d$, a focal length of the entire lens system by $f_t$, the interval of principal points between the front and rear lens groups by D, the length from the principale point of the rear lens group to the film surface by $X_B$ and the length from the principal point of the front lens group to the film surface by L, the telephoto ratio R in the paraxial optical system can be obtained as follows:

$$L = D + X_B$$

$$\frac{1}{f_d} = -\frac{1}{f_c - D} + \frac{1}{X_B}$$

thus, $$\frac{1}{X_B} = \frac{1}{f_c - D} + \frac{1}{f_d} = \frac{f_d + f_c - D}{f_d(f_c - D)}$$

$$\frac{1}{f_t} = \frac{1}{f_c} + \frac{1}{f_d} - \frac{D}{f_c \cdot f_d}$$

therefore, $$R = \frac{L}{f_t} = \frac{D + X_B}{f_t} \tag{a}$$

$$= \left(\frac{1}{f_c} + \frac{1}{f_d} - \frac{D}{f_c \cdot f_d}\right)\left(D + \frac{f_d(f_c - D)}{f_d + f_c - D}\right)$$

$$= \left(\frac{f_d + f_c - D}{f_c \cdot f_d}\right) D - \frac{D}{f_c} + 1$$

$$= \frac{D}{f_d}\left(1 - \frac{D}{f_c}\right) + 1$$

$$\frac{1}{f_t} = \frac{f_d + f_c - D}{f_c \cdot f_d}$$

therefore, $$R = \left(\frac{f_d + f_c - D}{f_c \cdot f_d}\right) D - \frac{D}{f_c} + 1 \tag{b}$$

$$= \frac{D}{f_t} - \frac{D}{f_c} + 1$$

$$= \frac{D}{f_t}\left(1 - \frac{f_t}{f_c}\right) + 1$$

The Petzval's sum is a parameter which can show a curvature of field and it has been known as can be represented by the following expression (c).

$$P = \sum_i \frac{1}{n_i f_i} \tag{c}$$

In the expression (b) among these expressions (a), (b) and (c), $(1 - f_t/f_b)$ is a negative value in the telephoto type lens system so that it is necessary to make $f_t/f_c$ large in order to make the telephoto ratio small. According to the present invention, as shown in condition (1), the telephoto ratio is intended to be made small by making $f_t/f_c$ (that is, $f/f_{123}$) larger than 1.2, and when $f/f_{123}$ is smaller than 1.2, it is impossible to make the telephoto ratio R small.

In the expression (a), the total value of $(D/f_d)(1 - D/f_c)$ is in the negative because $f_d$ is in the negative value so that $|1/f_d|$ may be made large in order to make the telephoto ratio R small. Thus, according to the present invention, the telephoto ratio R is intended to be made small by making $f/f_{456}$ smaller than $-0.30$. That is, it becomes impossible to make the telephoto ration small if $f/f_{456}$ is larger than $-0.30$.

As seen from the expression (b), the telephoto ratio R becomes small if D is made larger so that, according to the present invention, $d_6/f$ is made larger than 0.16, and $d_6$ which corresponds to D is made large. Therefore, when $d_6/f$ is outside of the condition (3), the telephoto ratio becomes large. Further, when $d_6/f$ is larger than 0.175, the light amount of the marginal part of the image field will become insufficient.

Next, in order to secure good lens characteristics over an angular field of view wider than 60° in the telephoto type lens system, it is necessary that a curvature of field and an astigmatic difference be of small values. For the purpose of achieving a good condition of the curvature of field, it is necessary to make the focal length of the front convergent lens group as long as possible. Therefore, as shown in the condition (1), it is necessary that $f/f_{123}$ be smaller than 1.8. If the upper limit under this condition (1) is exceeded, the curvature of field becomes large.

Next, in order to keep an oblique beam of light symmetrical, the fourth lens component in the rear dispersive lens group is formed in a tightly curved meniscus shape. However, in order to make the telephoto ratio small as explained above, $f/f_{456}$ is made smaller than $-0.30$ and, as the power of the rear lens group is increased, the absolute value of the radius of curvature of the surface of the fourth lens component at the object side becomes small and the bulging of the axial spherical aberration becomes large with a consequence of a marked deterioration of the lens characteristics on the axis. Therefore, in order to prevent the deterioration of the lens characteristics on the axis, it is desirable that $f/f_{456}$ be kept larger than $-1.3$ while $|r_7|/f$ is made larger than 0.15. When $f/f_{456}$ becomes smaller than $-1.3$, the lens characteristics on the axis will deteriorate.

According to the present invention, a photographic lens system having further good lens characteristics can be obtained by forming the lens system so as to satisfy the following conditions:

$$0.12 < [(d_{7 \sim 11})/f] < 0.2 \tag{4}$$

$$0.002 < 1/\phi_1 < 0.02 \tag{5}$$

$$0.002 < 1/\phi_2 < 0.03 \tag{6}$$

wherein the reference symbol $d_{7\sim 11}$ represents the length $(d_7 + d_8 + d_9 + d_{10} + d_{11})$ from the surface of the fourth lens component on the object side to the surface of the sixth lens component on the object side, the symbol $\phi_1$ represents a value near the focal length of the air lens between the fourth and fifth lens components expressed by $1/\phi_1 = (1 - n_4)/r_8 + (n_5 - 1)/r_9$, and the symbol $\phi_2$ represents a value near the focal length of the air lens between the fifth and sixth lens components expressed by $1/\phi_2 = (1 - n_5)/r_{10} + (n_6 - 1)/r_{11}$.

In the lens system as disclosed in Japanese Published Examined Patent Application No. 76147/79, as the rear lens group consists of the fourth and sixth lens components, there are no means to improve the characteristics of the marginal part of the image field. In order to dissolve such defects, in the photographic lens system according to the present invention, the fifth lens component is formed of two positive meniscus lenses to increase the freedom of the design and to be thereby able to realize a lens system of favorable characteristics of the marginal part of the image field. However, the nearer the image side, the larger the effective diameter of the lens. When the lens is near the image plane, a flare or ghost will be caused to occur. Therefore, the length along the optical axis occupied by the rear lens group can not be made too large.

The lower limit value of 0.12 in the condition (4) is necessary to make the lens system of a wide angle and particularly to obtain a sufficient light amount of the part of the image field. If this lower limit value is exceeded, no sufficient light amount of the marginal part of the image field will be obtained. Further, the upper limit value of 0.2 in the condition (4) is provided, as described above, in order to prevent the effective diameter of the lens from becoming larger. If this upper limit value is exceeded, the effective diameter well become large and such defect described above as of causing a flare or ghost will be produced.

Further, as the above mentioned freedom is increased in the rear group, two air lenses are provided in the rear group. If the refracting power of these air lenses are defined as shown in the conditions (5) and (6), the characteristics of the marginal part of the image field will be able to be improved. That is to say, in order to improve the characteristics of the marginal part of the image field, it is necessary to gradually converge the light dispersed by the fourth lens component. Therefore, it is necessary to make the above mentioned air lenses have some positive refracting powers. Showing the limits are the lower limit values in the conditions (5) and (6). Therefore, if the lower limit values of these conditions are exceeded, the characteristics of the marginal part of the image field will deteriorate. On the other hand, as the beam of light collecting in the center and the beam of light in the marginal part pass through the separate parts of the respective lenses of the rear group, it is necessary to balance the positive refracting powers of the respective beams of light. If the upper limit values in the conditions (5) and (6) are exceeded, the above mentioned positive refracting powers will be no longer balanced and the curvature of the field will become so large and the distortion will also become so large as to be undesirable.

Now, some preferred embodiments of the present invention relating to the photographic lens system as described above are given below:

Embodiment 1

$r_1 = 27.297$
$r_2 = 56.104$
$r_3 = -266.623$
$r_4 = 52.935$
$r_5 = 47.183$
$r_6 = -181.812$
$r_7 = -18.354$
$r_8 = -38.475$
$r_9 = -122.376$
$r_{10} = -93.488$
$r_{11} = -214.124$
$r_{12} = -89.862$
$f = 100$, $d_1 = 7.35$, $n_1 = 1.788$, $\nu_1 = 47.43$
$d_2 = 3.09$
$d_3 = 2.94$, $n_2 = 1.78472$, $\nu_2 = 25.71$
$d_4 = 4.48$
$d_5 = 10.79$, $n_3 = 1.72$, $\nu_3 = 46.03$
$d_6 = 16.47$
$d_7 = 2.94$, $n_4 = 1.7859$, $\nu_4 = 44.18$
$d_8 = 0.59$
$d_9 = 4.40$, $n_5 = 1.7495$, $\nu_5 = 35.27$
$d_{10} = 0.59$
$d_{11} = 6.47$, $n_6 = 1.7495$, $\nu_6 = 35.27$

Telephoto Ratio 0.997
$f_{123} = 58.6$, $f_{456} = -83.2$, $d_{7\sim11} = 14.99$
$1/\phi_1 = 0.01430 \ (\phi_1 = 70.0)$
$1/\phi_2 = 0.00452 \ (\phi_2 = 221.4)$
$f/f_{123} = 1.706$, $f/f_{456} = -1.202$

Embodiment 2

$r_1 = 27.934$
$r_2 = 57.108$
$r_3 = -435.134$
$r_4 = 55.194$
$r_5 = 48.061$
$r_6 = -463.371$
$r_7 = -19.499$
$r_8 = -36.644$
$r_9 = -124.084$
$r_{10} = -89.421$
$r_{11} = -192.263$
$r_{12} = -87.173$
$f = 100$, $d_1 = 7.35$, $n_1 = 1.788$, $\nu_1 = 47.43$
$d_2 = 3.09$
$d_3 = 2.94$, $n_2 = 1.78472$, $\nu_2 = 25.71$
$d_4 = 4.47$
$d_5 = 10.80$, $n_3 = 1.72$, $\nu_3 = 46.03$
$d_6 = 16.47$
$d_7 = 2.94$, $n_4 = 1.7859$, $\nu_4 = 44.18$
$d_8 = 0.59$
$d_9 = 3.41$, $n_5 = 1.62364$, $\nu_5 = 36.54$
$d_{10} = 0.59$
$d_{11} = 6.47$, $n_6 = 1.62364$, $\nu_6 = 36.54$

Telephoto Ratio 0.997
$f_{123} = 62.4$, $f_{456} = -99.6$, $d_{7\sim11} = 0.14$
$1/\phi_1 = 0.0164 \ (\phi_1 = 60.9)$
$1/\phi_2 = 0.00373 \ (\phi_2 = 268.1)$
$f/f_{123} = 1.603$, $f/f_{456} = -1.004$

Embodiment 3

$r_1 = 27.162$
$r_2 = 62.322$
$r_3 = -1793.892$
$r_4 = 77.767$
$r_5 = 84.475$
$r_6 = -478.777$
$r_7 = -15.239$
$r_8 = -50.169$
$r_9 = -68.295$
$r_{10} = -32.886$
$r_{11} = -73.708$
$r_{12} = -38.697$
$f = 100$, $d_1 = 8.38$, $n_1 = 1.72916$, $\nu_1 = 54.68$
$d_2 = 5.03$
$d_3 = 2.90$, $n_2 = 1.78472$, $\nu_2 = 25.71$
$d_4 = 3.94$
$d_5 = 5.85$, $n_3 = 1.6968$, $\nu_3 = 56.49$
$d_6 = 16.90$
$d_7 = 2.90$, $n_4 = 1.6727$, $\nu_4 = 32.1$
$d_8 = 0.29$
$d_9 = 7.83$, $n_5 = 1.61293$, $\nu_5 = 37$
$d_{10} = 0.29$
$d_{11} = 7.83$, $n_6 = 1.64769$, $\nu_6 = 33.8$

Telephoto Ratio 1.014
$f_{123} = 64.9$, $f_{456} = -304.6$, $d_{7\sim11} = 19.14$
$1/\phi_1 = 0.00443 \ (\phi_1 = 225.5)$
$1/\phi_2 = 0.00985 \ (\phi_2 = 101.515)$
$f/f_{123} = 1.54$, $f/f_{456} = -0.328$ wherein the reference symbols $r_1$ through $r_{12}$ represent the radii of curvature of the respective lens surfaces, the symbols $d_1$ through $d_{11}$ represent the axial thicknesses of the respective lenses and axial air spaces between the lenses, the symbols $n_1$ through $n_6$ represent the refractive indices of the respective lenses, and the symbols $\nu_1$ through $\nu_6$ represent the Abbe's numbers of the respective lenses, respectively.

The Seidel's aberration coefficients of the above respective embodiments are as follows:

| Spherical aberration | Astigmatism | Coma | Distortion | Petzval |
|---|---|---|---|---|
| Embodiment 1 | | | | |

-continued

| | Spherical aberration | Astigmatism | Coma | Distortion | Petzval |
|---|---|---|---|---|---|
| 1 | 11.9614 | 0.0403 | −0.6939 | −0.0956 | 1.6076 |
| 2 | 0.0025 | 0.8577 | −0.0465 | −1.3928 | −0.7822 |
| 3 | −3.6646 | −2.7707 | 3.1865 | 2.5520 | −0.1642 |
| 4 | −0.3420 | −0.1771 | −0.2461 | −0.7227 | −0.8271 |
| 5 | 0.5006 | 0.2410 | 0.3474 | 0.7803 | 0.8834 |
| 6 | 3.6510 | 1.8925 | −2.6286 | −1.5276 | 0.2293 |
| 7 | −11.9811 | −0.0638 | 0.8746 | 0.1789 | −2.3874 |
| 8 | 1.1413 | 0.4926 | −0.7498 | −1.0718 | 1.1389 |
| 9 | −0.2837 | −0.6779 | 0.4386 | 1.5866 | −0.3486 |
| 10 | 0.4141 | 0.5625 | −0.4826 | −1.1873 | 0.4563 |
| 11 | −0.2350 | −0.6415 | 0.3882 | 1.3890 | −0.1992 |
| 12 | 0.5835 | 0.3736 | −0.4669 | −0.6788 | 0.4747 |
| | 1.7480 | 0.1291 | −0.0791 | −0.1897 | 0.0815 |
| Embodiment 2 | | | | | |
| 1 | 11.1663 | 0.0300 | −0.5787 | −0.0830 | 1.5710 |
| 2 | 0.0009 | 0.8136 | −0.0271 | −1.3588 | −0.7684 |
| 3 | −2.9166 | −2.4995 | 2.7000 | 2.4071 | −0.1006 |
| 4 | −0.1876 | −0.1293 | −0.1557 | −0.7659 | −0.7932 |
| 5 | 0.3218 | 0.1899 | 0.2472 | 0.8122 | 0.8673 |
| 6 | 2.2654 | 1.6779 | −1.9497 | −1.5215 | 0.0900 |
| 7 | −10.6751 | −0.0961 | 1.0127 | 0.2223 | −2.2473 |
| 8 | 1.4007 | 0.4458 | −0.7903 | −0.9262 | 1.1958 |
| 9 | −0.2973 | −0.6164 | 0.4281 | 1.3314 | −0.3082 |
| 10 | 0.4632 | 0.5172 | −0.4895 | −0.9986 | 0.4277 |
| 11 | −0.2660 | −0.5887 | 0.3957 | 1.1717 | −0.1989 |
| 12 | 0.5798 | 0.3446 | −0.4470 | −0.6039 | 0.4387 |
| | 1.8554 | 0.0892 | 0.3459 | −0.3131 | 0.1738 |
| Embodiment 3 | | | | | |
| 1 | 12.1688 | 0.0541 | −0.8112 | −0.1071 | 1.5525 |
| 2 | 0.0491 | 1.0056 | −0.2222 | −1.4887 | −0.6766 |
| 3 | −2.6546 | −2.4096 | 2.5291 | 2.3191 | −0.0245 |
| 4 | 0.0033 | 0.4513 | 0.0385 | −1.3364 | −0.5654 |
| 5 | −0.0000 | −0.4932 | 0.0026 | 1.3499 | 0.4861 |
| 6 | 2.0639 | 1.7077 | −1.8773 | −1.6313 | 0.0858 |
| 7 | −12.3048 | −0.0000 | 0.0220 | 0.0047 | −2.6390 |
| 8 | 0.2108 | 0.4458 | −0.3066 | −1.8137 | 0.8016 |
| 9 | −0.1142 | −0.4376 | 0.2235 | 1.9457 | −0.5564 |
| 10 | 1.2086 | 0.0696 | −0.2901 | −0.2940 | 1.1555 |
| 11 | −0.3949 | −0.3210 | 0.3560 | 0.7702 | −0.5333 |
| 12 | 1.4803 | 0.0032 | 0.0693 | 0.0477 | 1.0158 |
| | 1.7163 | 0.0758 | −0.2662 | −0.2340 | 0.1021 |

I claim:

1. A photographic lens system comprising: a front lens group consisting of a first lens component of a positive meniscus lens with its convex surface on the object side, a second lens component of a biconcave lens and a third lens component of a biconvex lens; and a rear lens group consisting of a fourth lens component of a negative meniscus lens with its convex surface on the object side, a fifth lens component of a positive meniscus lens with its convex surface on the image side and a sixth lens component of a positive meniscus lens with its convex surface on the image side, said lens system satisfying the following conditions:

$$1.2 < f/f_{123} < 1.8 \quad (1)$$

$$-1.3 < f/f_{456} < -0.3 \quad (2)$$

$$0.16 < d_6/f < 0.175 \quad (3)$$

wherein the reference symbol $f$ represents the focal length of the entire lens system, the symbol $f_{123}$ represents the focal length of the front lens group, the symbol $f_{456}$ represents the focal length of the rear lens group, and the symbol $d_6$ represents the axial air space between the front and rear lens groups, respectively.

2. A photographic lens system according to claim 1, further satisfying the following conditions:

$$0.12 < (d_{7\sim 11})/f < 0.2 \quad (4)$$

$$0.002 < 1/\phi_1 < 0.02 \quad (5)$$

$$0.002 < 1/\phi_2 < 0.013 \quad (6)$$

wherein $d_{7\sim 11} = d_7 + d_8 + d_9 + d_{10} + d_{11}$, $1/\phi_1 =$ $$(1 - n_4)\frac{1}{r_8} + (n_5 - 1)\frac{1}{r_9}, \quad 1/\phi_2 =$$

$$(1 - n_5)\frac{1}{r_{10}} + (n_6 - 1)\frac{1}{r_{11}},$$

in which the reference symbols $d_7$, $d_9$ and $d_{11}$ represent the axial thicknesses of the fourth, fifth and sixth lens components, the symbol $d_8$ and $d_{10}$ represent the axial air space between the fourth and fifth lens components and the axial air space between the fifth and sixth lens components, the symbols $n_4$, $n_5$ and $n_6$ represent the refractive indices of the fourth, fifth and sixth lens components, the symbols $r_8$ and $r_{10}$ represent the radii of curvature of the image side surfaces of the fourth and fifth lens components, and the symbols $r_9$ and $r_{11}$ represent the radii of curvature of the object side surfaces of the fifth and sixth lens components, respectively.

3. A photographic lens system according claim 2 having the following data:

| | | | |
|---|---|---|---|
| $r_1 = 27.297$ | $d_1 = 7.35$ | $n_1 = 1.788$ | $v_1 = 47.43$ |
| $r_2 = 56.104$ | $d_2 = 3.09$ | | |
| $r_3 = -266.623$ | $d_3 = 2.94$ | $n_2 = 1.78472$ | $v_2 = 25.71$ |
| $r_4 = 52.935$ | $d_4 = 4.48$ | | |
| $r_5 = 47.183$ | $d_5 = 10.79$ | $n_3 = 1.72$ | $v_3 = 46.03$ |
| $r_6 = -181.812$ | $d_6 = 16.47$ | | |
| $r_7 = -18.354$ | $d_7 = 2.94$ | $n_4 = 1.7859$ | $v_4 = 44.18$ |
| $r_8 = -38.475$ | $d_8 = 0.59$ | | |
| $r_9 = -122.376$ | $d_9 = 4.40$ | $n_5 = 1.7495$ | $v_5 = 35.27$ |
| $r_{10} = -93.488$ | $d_{10} = 0.59$ | | |
| $r_{11} = -214.124$ | $d_{11} = 6.47$ | $n_6 = 1.7495$ | $v_6 = 35.27$ |
| $r_{12} = -89.862$ | | | |
| $f = 100$, | | Telephoto Ratio 0.997 | |
| $f_{123} = 58.6$ | | $f_{456} = -83.2$ | $d_{7\sim 11} = 14.99$ |
| $1/\phi_1 = 0.01430 (\phi_1 = 70.0)$ | | | |
| $1/\phi_2 = 0.00452 (\phi_2 = 221.4)$ | | | |
| $f/f_{123} = 1.706$, | | $f/f_{456} = -1.202$ | | wherein the reference symbols $r_1$ through $r_{12}$ represent the radii of curvature of the respective lens surfaces, the symbols $d_1$ through $d_{11}$ represent the axial thicknesses of the respective lenses and axial air spaces between the lenses, the symbols $n_1$ through $n_6$ represent the refractive indices of the respective lenses, and the symbols $v_1$ through $v_6$ represent the Abbe's numbers of the respective lenses, respectively.

4. A photographic lens system according to claim 2 having the following data:

| | | | |
|---|---|---|---|
| $r_1 = 27.934$ | $d_1 = 7.35$ | $n_1 = 1.788$ | $v_1 = 47.43$ |
| $r_2 = 57.108$ | | | |

-continued

| | $d_2 = 3.09$ | | |
|---|---|---|---|
| $r_3 = -435.134$ | | | |
| | $d_3 = 2.94$ | $n_2 = 1.78472$ | $\nu_2 = 25.71$ |
| $r_4 = 55.194$ | | | |
| | $d_4 = 4.47$ | | |
| $r_5 = 48.061$ | | | |
| | $d_5 = 10.80$ | $n_3 = 1.72$ | $\nu_3 = 46.03$ |
| $r_6 = -463.371$ | | | |
| | $d_6 = 16.47$ | | |
| $r_7 = -19.499$ | | | |
| | $d_7 = 2.94$ | $n_4 = 1.7859$ | $\nu_4 = 44.18$ |
| $r_8 = -36.644$ | | | |
| | $d_8 = 0.59$ | | |
| $r_9 = -124.084$ | | | |
| | $d_9 = 3.41$ | $n_5 = 1.62364$ | $\nu_5 = 36.54$ |
| $r_{10} = -89.421$ | | | |
| | $d_{10} = 0.59$ | | |
| $r_{11} = -192.263$ | | | |
| | $d_{11} = 6.47$ | $n_6 = 1.62364$ | $\nu_6 = 36.54$ |
| $r_{12} = -87.173$ | | | |
| $f = 100$, | | Telephoto Ratio 0.997 | |
| $f_{123} = 62.4$, | | $f_{456} = -99.6$, | $d_{7\sim 11} = 0.14$ |
| $1/\phi_1 = 0.0164(\phi_1 = 60.9)$ | | | |
| $1/\phi_2 = 0.00373(\phi_2 = 268.1)$ | | | |
| $f/f_{123} = 1.603$, | | $f/f_{456} = -1.004$ | | wherein the reference symbols $r_1$ through $r_{12}$ represent the radii of curvature of the respective lens surfaces, the symbols $d_1$ through $d_{11}$ represent the axial thicknesses of the respective lenses and axial air spaces between the lenses, the symbols $n_1$ through $n_6$ represent the refractive indices of the respective lenses, and the symbols $\nu_1$ through $\nu_6$ represent the Abbe's numbers of the respective lenses, respectively.

5. A photographic lens system according to claim 2 having the following data:

| | $d_1 = 8.38$ | $n_1 = 1.72916$ | $\nu_1 = 54.68$ |
|---|---|---|---|
| $r_1 = 27.162$ | | | |
| $r_2 = 62.322$ | | | |
| | $d_2 = 5.03$ | | |
| $r_3 = -1793.892$ | | | |
| | $d_3 = 2.90$ | $n_2 = 1.78472$ | $\nu_2 = 25.71$ |
| $r_4 = 77.767$ | | | |
| | $d_4 = 3.94$ | | |
| $r_5 = 84.475$ | | | |
| | $d_5 = 5.85$ | $n_3 = 1.6968$ | $\nu_3 = 56.49$ |
| $r_6 = -478.777$ | | | |
| | $d_6 = 16.90$ | | |
| $r_7 = -15.239$ | | | |
| | $d_7 = 2.90$ | $n_4 = 1.6727$ | $\nu_4 = 32.1$ |
| $r_8 = -50.169$ | | | |
| | $d_8 = 0.29$ | | |
| $r_9 = -68.295$ | | | |
| | $d_9 = 7.83$ | $n_5 = 1.61293$ | $\nu_5 = 37$ |
| $r_{10} = -32.886$ | | | |
| | $d_{10} = 0.29$ | | |
| $r_{11} = -73.708$ | | | |
| | $d_{11} = 7.83$ | $n_6 = 1.64769$ | $\nu_6 = 33.8$ |
| $r_{12} = -38.697$ | | | |
| $f = 100$, | | Telephoto Ratio 1.014 | |
| $f_{123} = 64.9$ | | $f_{456} = -304.6$ | $d_{7\sim 11} = 19.14$ |
| $1/\phi_1 = 0.00443(\phi_1 = 225.5)$ | | | |
| $1/\phi_2 = 0.00985(\phi_2 = 101.515)$ | | | |
| $f/f_{123} = 1.54$ | | $f/f_{456} = -0.328$ | | wherein the reference symbols $r_1$ through $r_{12}$ represent the radii of curvature of the respective lens surfaces, the symbols $d_1$ through $d_{11}$ represent the axial thicknesses of the respective lenses and axial air spaces between the lenses, the symbols $n_1$ through $n_6$ represent the refractive indices of the respective lenses, and the symbols $\nu_1$ through $\nu_6$ represent the Abbe's numbers of the respective lenses, respectively.

* * * * *